(12) United States Patent
Ohbayashi et al.

(10) Patent No.: US 8,554,443 B2
(45) Date of Patent: Oct. 8, 2013

(54) VEHICLE TRAVEL CONTROL DEVICE

(75) Inventors: Motonari Ohbayashi, Susono (JP);
Ayako Nishimura, Gotemba (JP);
Masayuki Naito, Takahama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 269 days.

(21) Appl. No.: 13/254,716

(22) PCT Filed: Mar. 6, 2009

(86) PCT No.: PCT/JP2009/054328
§ 371 (c)(1),
(2), (4) Date: Sep. 2, 2011

(87) PCT Pub. No.: WO2010/100761
PCT Pub. Date: Sep. 10, 2010

(65) Prior Publication Data
US 2011/0320102 A1 Dec. 29, 2011

(51) Int. Cl.
*B60K 31/00* (2006.01)
*B60W 30/14* (2006.01)
*B60T 8/32* (2006.01)
*B60K 31/04* (2006.01)

(52) U.S. Cl.
CPC .......... *B60K 31/047* (2013.01); *B60W 2540/18* (2013.01); *B60W 2550/142* (2013.01); *B60W 2720/10* (2013.01); *B60W 2720/106* (2013.01); *B60W 2540/12* (2013.01)
USPC ................................. 701/93; 701/94; 701/96

(58) Field of Classification Search
CPC ........... B60K 31/047; B60W 2540/18; B60W 2540/12; B60W 2550/142; B60W 2720/10; B60W 2720/106
USPC ................................. 701/93, 94, 96
See application file for complete search history.

(56) References Cited

U.S. PATENT DOCUMENTS 5,508,925 A * 4/1996 Katayama et al. .............. 701/93
6,006,848 A * 12/1999 Boehringer et al. .......... 180/178
(Continued)

FOREIGN PATENT DOCUMENTS

JP  A-07-137560   5/1995
JP  07164919 A * 6/1995
(Continued)

OTHER PUBLICATIONS

International Search Report issued in Application No. PCT/JP2009/054328; Dated Apr. 7, 2009 (With Translation).

*Primary Examiner* — Helal A Algahaim
*Assistant Examiner* — Angelina Shudy
(74) *Attorney, Agent, or Firm* — Oliff & Berridge, PLC

(57) ABSTRACT

An ECU designates a value of a variation "$V_{under}$" based on at least one of information about driver's operation, a velocity, and a road surface gradient when an actual velocity "V" is higher than a target velocity, sets a value of a variation "$V_{target}$" based on the designated value of the variation "$V_{under}$" and the target velocity, adjusts the velocity of the vehicle to the velocity of the set value of the variation "$V_{target}$", and determines whether the actual velocity "V" after the adjustment is a value not greater than the value of the variation "$V_{target}$". Then, the ECU converges the velocity of the vehicle to the target velocity after it has been determined that the actual velocity "V" after the adjustment is a value not greater than the value of the variation "$V_{target}$".

1 Claim, 4 Drawing Sheets

(56) References Cited

U.S. PATENT DOCUMENTS

| | | | |
|---|---|---|---|
| 6,266,604 B1* | 7/2001 | Linden | 701/93 |
| 6,317,678 B1 | 11/2001 | Linden | |
| 6,411,883 B1* | 6/2002 | Basten | 701/93 |
| 8,442,741 B2* | 5/2013 | Minase et al. | 701/102 |
| 2003/0182046 A1* | 9/2003 | Nada | 701/93 |
| 2003/0195691 A1 | 10/2003 | Konishi et al. | |
| 2007/0191997 A1* | 8/2007 | Isaji et al. | 701/1 |
| 2007/0255477 A1* | 11/2007 | Okuda et al. | 701/93 |
| 2010/0292888 A1* | 11/2010 | Taguchi | 701/29 |
| 2011/0295480 A1* | 12/2011 | Shimada et al. | 701/70 |
| 2012/0136506 A1* | 5/2012 | Takeuchi et al. | 701/1 |
| 2012/0143457 A1* | 6/2012 | Inoue et al. | 701/93 |
| 2012/0203440 A1* | 8/2012 | Matsunaga | 701/93 |

FOREIGN PATENT DOCUMENTS

| | | |
|---|---|---|
| JP | A-07-164918 | 6/1995 |
| JP | A-2000-198371 | 7/2000 |
| JP | A-2000-355236 | 12/2000 |
| JP | A-2001-173474 | 6/2001 |
| JP | A-2002-089314 | 3/2002 |
| JP | 2002123898 A * | 4/2002 |
| JP | A-2003-200752 | 7/2003 |
| JP | A-2003-301732 | 10/2003 |
| JP | A-2004-217083 | 8/2004 |
| JP | 2006044287 A * | 2/2006 |
| JP | A-2006-312924 | 11/2006 |

* cited by examiner

VEHICLE TRAVEL CONTROL DEVICE

TECHNICAL FIELD

The present invention relates to a vehicle travel control device for carrying out travel control of a vehicle (vehicle velocity adjustment).

BACKGROUND ART

In driving support function control for travel according to a target velocity, a velocity is conventionally adjusted to follow a set velocity so as not to depend on road surface disturbance. For example, Patent Document 1 discloses a technique related to a travel control device for increasing an engine speed to a predetermined engine speed greater than that during idling and controlling a braking force of a vehicle so that an actual velocity of the vehicle converges to a preset target vehicle velocity when the vehicle travels at the predetermined engine speed to thereby allow the vehicle to automatically travel at a predetermined velocity while preventing inappropriate travel of the vehicle. Patent Document 2 discloses a technique related to a vehicle control device capable of achieving satisfactory compatibility between shocks at the start and end of acceleration/deceleration and following capability to a target velocity in controlling a traveling velocity of a vehicle to adjust it to the target velocity. Patent Document 3 discloses a technique related to a cruise control device capable of causing an actual vehicle velocity to follow a target vehicle velocity more appropriately in cruise control.

Patent Document 4 discloses a technique related to a vehicle driving output control device for carrying out driving support for controlling a vehicle velocity to adjust it to a target vehicle velocity on condition that an accelerator is turned off. Patent Document 5 discloses a technique related to a vehicle driving output control device for suppressing an overshoot in bringing a vehicle velocity close to a target vehicle velocity when a constant velocity traveling condition is satisfied due to turning off of an accelerator. Patent Document 6 discloses a technique related to an automatic cruise control device and a method for causing a vehicle velocity to fall below a target value (undershoot) and conforming it to the target value in bringing the vehicle velocity close to the target vehicle velocity by deceleration during automatic cruising. Patent Document 7 discloses a technique related to a vehicle acceleration control device for suppressing an uncomfortable feeling of a driver by reducing a target acceleration on an upward slope and increasing the target acceleration on a downward slope in controlling an acceleration of the vehicle.

Patent Document 1: Japanese Patent Application Laid-open No. 2002-089314
Patent Document 2: Japanese Patent Application Laid-open No. 2004-217083
Patent Document 3: Japanese Patent Application Laid-open No 2006-312924
Patent Document 4: Japanese Patent Application Laid-open No. 7-137560
Patent Document 5: Japanese Patent Application Laid-open No. 7-164918
Patent Document 6: Japanese Patent Application Laid-open No. 2000-198371
Patent Document 7: Japanese Patent Application Laid-open No. 2001-173474

DISCLOSURE OF INVENTION

Problem to be Solved by the Invention

However, especially when the target velocity is a very low velocity such as few kilometers per hour, a driver feels a strong uncomfortable feeling about following a set velocity depending on a change of a road surface and operation by the driver. More specifically, when the accelerator is turned off and control for following the target vehicle velocity is carried out, the driver may feel an uncomfortable feeling depending on a traveling condition such as a road surface gradient.

The present invention has been made with the above problems in mind and its object is to provide a vehicle travel control device for adjusting a vehicle velocity without giving an uncomfortable feeling to a driver even when a target velocity is a very low velocity such as few kilometers per hour.

Means for Solving Problem

In order to achieve the above mentioned object, a vehicle travel control device according to the present invention that converges a velocity of a vehicle to a preset first target velocity, the device includes a designating means that designates a reduction range in the velocity based on vehicle traveling condition information obtained in advance including at least one of information related to driver's operation, the velocity, and a road surface gradient when the velocity of the vehicle is higher than the first target velocity; and a setting means that sets a second target velocity lower than the first target velocity based on the reduction range designated by the designating means and the first target velocity, wherein the velocity of the vehicle is converged to the second target velocity set by the setting means and then converged to the first target velocity.

Further, in the vehicle travel control device according to the present invention, the information related to the driver's operation includes information related to at least one of an operation amount of a brake pedal, an operation change amount of the accelerator pedal, and a steering angle operation amount of a steering and the designating means designates a small value for the reduction range when the operation amount of the brake pedal is large, designates a large value for the reduction range when the operation change amount of the accelerator pedal is large, and designates a large value for the reduction range when the steering angle operation amount of the steering is large.

Effect of the Invention

When the velocity of the vehicle is higher than the preset first target velocity, the present invention designates a reduction range in the velocity based on vehicle traveling condition information obtained in advance and including at least one of information related to driver's operation, the velocity, and a road surface gradient, sets a second target velocity lower than the first target velocity based on the designated reduction range and the first target velocity, converges the velocity of the vehicle to the set second target velocity, and then converges the velocity to the first target velocity. Thus, even if the target velocity (first target velocity) is a very low velocity such as few kilometers per hour, the present invention can adjust the vehicle velocity without giving an uncomfortable feeling to a driver. More specifically, in carrying out the control for following the target velocity when the accelerator is turned off, the present invention can adjust the vehicle velocity without giving an uncomfortable feeling to the driver due to a traveling condition such as the driver's operation, the road surface gradient, and the velocity. Moreover, in bringing the velocity close to the target vehicle velocity by deceleration, the present invention can decelerate without giving an uncomfortable feeling to the driver.

Furthermore, the present invention designates the small value for the reduction range when the operation amount of the brake pedal is large, designates a large value for the reduction range when the operation change amount of the accelerator pedal is large, and designates a large value for the reduction range when a steering angle operation amount of the steering is large. Thus, in following the target velocity, the present invention can achieve the optimal velocity adjustment without giving an uncomfortable feeling to the driver due to operation by the driver.

EXPLANATIONS OF LETTERS OR NUMERALS

Figure 1:
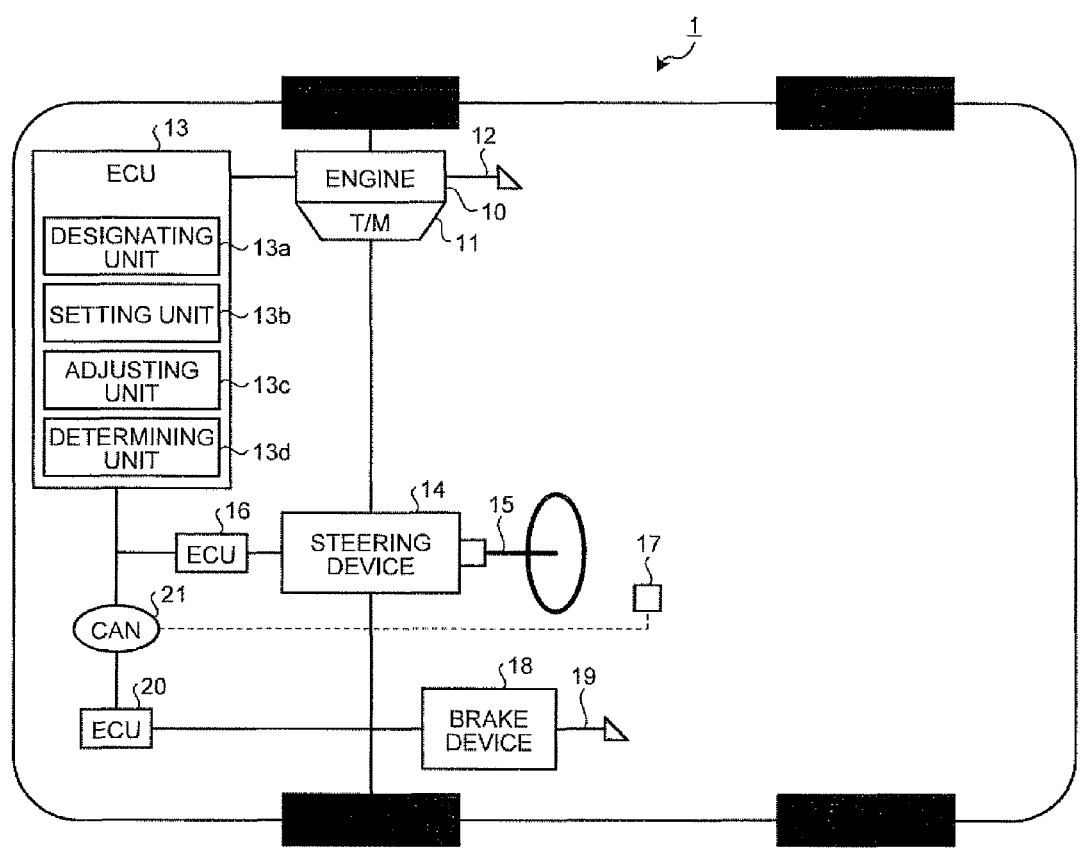
FIG. 1 is a diagram illustrating an example of a construction of a vehicle including a vehicle travel control device according to the present invention.

1 Vehicle
10 Engine
11 T/M
12 Accelerator pedal sensor
13 ECU
13a Designating unit
13b Setting unit
13c Adjusting unit
13d Determining unit
14 Steering device
15 Steering angle sensor
16 ECU
17 G sensor
18 Brake device
19 Brake pedal sensor
20 ECU
21 CAN

BEST MODE(S) FOR CARRYING OUT THE INVENTION

An embodiment of a vehicle travel control device according to the present invention will be described below in detail based on the drawings. The invention is not limited to the embodiment.

1. Construction

A construction of a vehicle including the vehicle travel control device according to the present invention will be described with reference to FIG. 1. FIG. 1 is a diagram illustrating an example of the construction of the vehicle including the vehicle travel control device according to the invention.

In FIG. 1, a reference numeral 1 designates the vehicle. A reference numeral 10 designates an engine, a reference numeral 11 designates a transmission (T/M), a reference numeral 12 designates an accelerator pedal sensor, and a reference numeral 13 designates an electronic control unit (ECU). A reference numeral 14 designates a steering device, a reference numeral 15 designates a steering angle sensor, and a reference numeral 16 designates an ECU. A reference numeral 17 designates a gravitational acceleration (G) sensor. A reference numeral 18 designates a brake device, a reference numeral 19 designates a brake pedal sensor, and a reference numeral 20 designates an ECU. A reference numeral 21 designates a controller area network (CAN).

The accelerator pedal sensor 12 is a sensor for detecting an operation amount, an operation change amount, and an operation change rate of an accelerator pedal. The steering angle sensor 15 is a sensor for detecting an operation amount, an operation change amount, and an operation change rate of a steering. The G sensor 17 is a sensor for detecting gravitational acceleration. The brake pedal sensor 19 is a sensor for detecting an operation amount, an operation change amount, and an operation change rate of a brake pedal. The CAN 21 mediates data transfer between the ECU 13, the ECU 16, and the ECU 20 connected to each other. The CAN 21 mediates transfer of data detected by the G sensor 17 to the respective ECUs.

The ECU 13 is an electronic control unit for controlling operation of the engine 10. The ECU 13 has a function of conforming a velocity of the vehicle 1 to a preset first target velocity and includes a designating unit 13a, a setting unit 13b, an adjusting unit 13c, and a determining unit 13d.

The designating unit 13a designates a reduction range (an undershoot amount) of the velocity based on vehicle traveling condition information obtained in advance. As the vehicle traveling condition information, specifically, there are information about driver's operation, a velocity (specifically, the velocity at a start of control), and a road surface gradient. As the information about the driver's operation, specifically, there are brake pedal operation (e.g., MC pressure, a stroke, and a stop lamp SW), accelerator pedal operation (which may be a throttle position detected by a throttle position sensor of the vehicle 1), and steering operation (e.g., a steering angle). The designating unit 13a may designate a small reduction range when the operation amount of the brake pedal is large, may designate a large reduction range when the operation change amount of the accelerator pedal is large, and may designate a large reduction range when the steering angle operation amount of a steering is large.

The setting unit 13b sets a second target velocity lower than a first target velocity based on the reduction range designated by the designating unit 13a and the first target velocity. The adjusting unit 13c adjusts the velocity of the vehicle 1 to the second target velocity set by the setting unit 13b by optimally controlling respective pieces of equipment (specifically, the engine 10, the T/M 11, the brake device 18, and the like) of the vehicle 1. The determining unit 13d determines whether or not the velocity of the vehicle 1 has converged to the second target velocity set by the setting unit 13b after the adjustment by the adjusting unit 13c.

The ECU 16 is the electronic control unit for controlling operation of the steering device 14. The ECU 20 is the electronic control unit for controlling operation of the brake device 18.

Although the vehicle travel control device according to the present invention (specifically, the respective means included in the vehicle travel control device according to the present invention) will be described as being included in the ECU 13 in the embodiment, it may be included in the ECU 16 or the ECU 20 or may be included in another ECU (which may be newly installed) connected to the CAN 21. The respective means included in the vehicle travel control device according to the present invention may be separately included in (distributed to) the plurality of different ECUs connected to the CAN 21.

2. Processing

Figure 2:
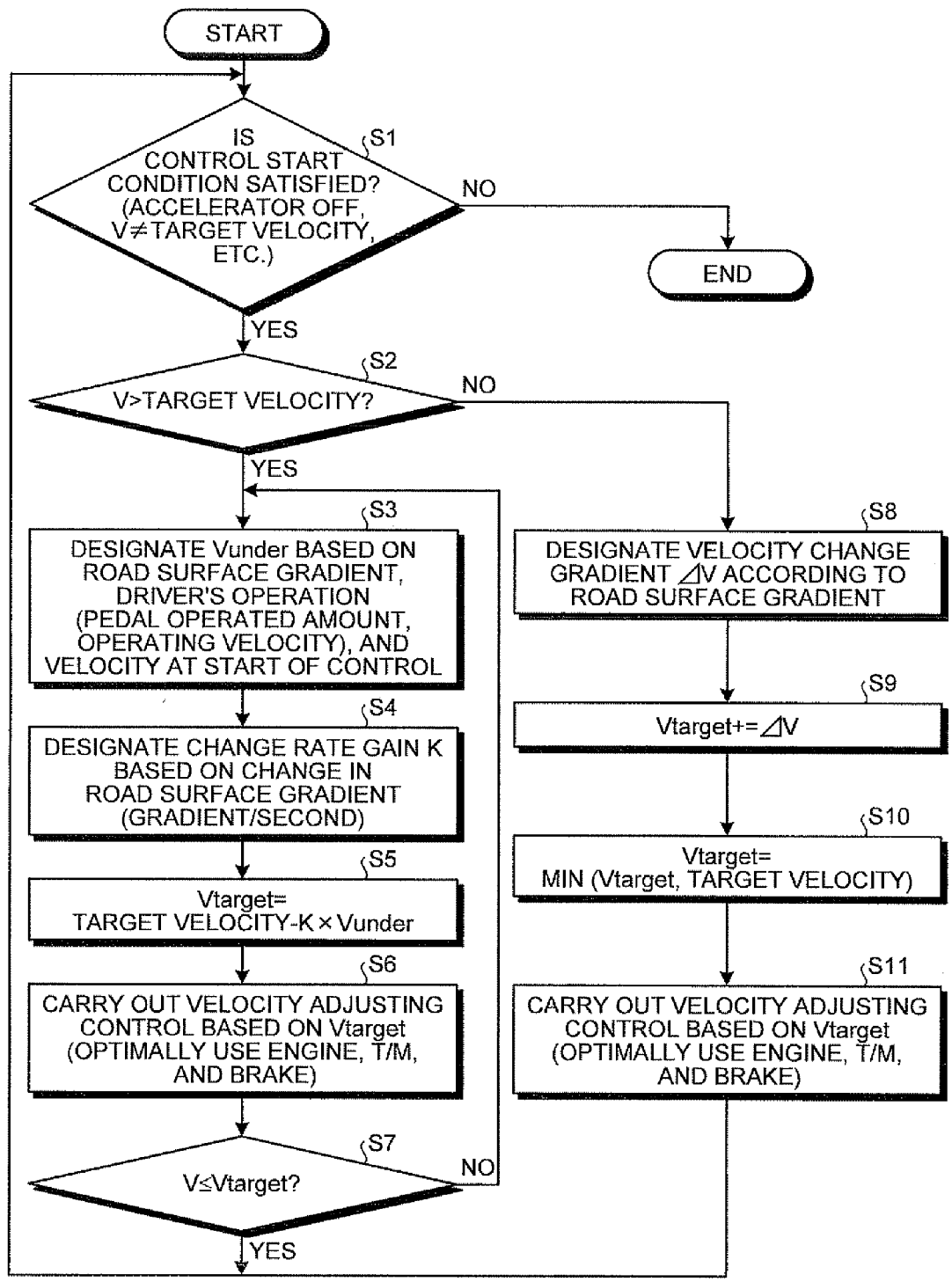
FIG. 2 is a flowchart illustrating an example of a vehicle travel control processing according to the present embodiment.

Next, vehicle travel control processing according to the embodiment will be specifically described with reference to FIGS. 2 to 6. FIG. 2 is a flowchart illustrating an example of the vehicle travel control processing according to the embodiment.

The ECU 13 compares the actual velocity "V" of the vehicle 1 and the preset target velocity (first target velocity) when a control start condition (e.g., a condition that the accelerator is turned off or that the actual velocity "V" of the vehicle 1 is different from the target velocity") is satisfied (step S1: Yes).

Next, if the actual velocity "V" is higher than the target velocity (step S2: Yes), the designating unit 13a designates a value of a variable "$V_{under}$" for retaining an undershoot amount (reduction range) of the velocity based on information about driver's operation detected by the accelerator pedal sensor 12, the steering angle sensor 15, and the brake pedal sensor 19, the road surface gradient detected by the G sensor 17, and a velocity at the start of the control (the velocity detected at the start of the control and specifically, the velocity when the accelerator pedal is turned off) (step S3). As the information about the driver's operation, there are a pedal operation amount or an operating velocity, for example. Specifically, there are the operation amount, the operation change amount, and the operation change rate of the accelerator pedal detected by the accelerator pedal sensor 12, the operation amount, the operation change amount, and the operation change rate of the steering detected by the steering angle sensor 15, and the operation amount, the operation change amount, and the operation change rate of the brake pedal detected by the brake pedal sensor 19.

Figure 3:
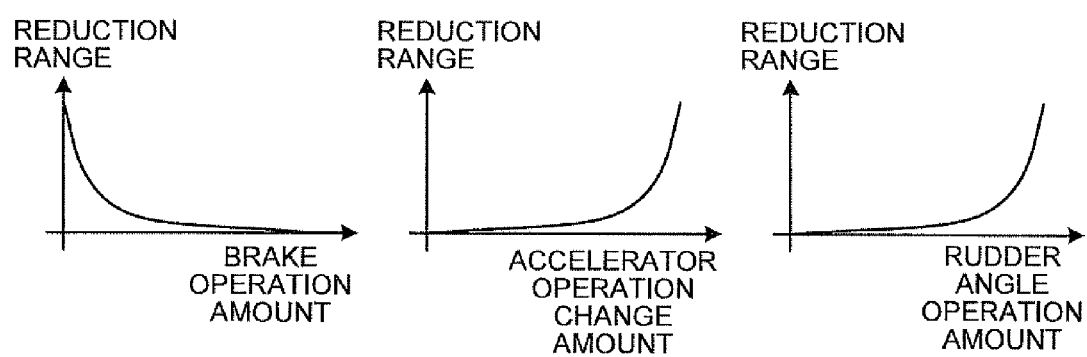
FIG. 3 illustrates diagrams illustrating examples of a relationship between a reduction range and a brake pedal operation amount, a relationship between the reduction range and an accelerator pedal operation change amount, and a relationship between the reduction range and a steering angle operation amount.

At this point, an example of a method of designating the undershoot amount will be described with reference to FIG. 3. FIG. 3 illustrates diagram illustrating examples of a relationship between the reduction range and the brake pedal operation amount, a relationship between the reduction range and the accelerator pedal operation change amount, and a relationship between the reduction range and the steering angle operation amount. The designating unit 13a designates the value of the variation "$V_{under}$" based on the operation amount of the brake pedal, the operation change amount of the accelerator pedal, and the steering angle operation amount of the steering and with reference to the preset respective maps in FIG. 3. A priority order may be specified in advance for the respective maps and the maps may be referred to in this priority order and the value of the variation "$V_{under}$" may be designated. Evaluation functions corresponding to the respective maps may be provided in advance, the respective evaluation functions may be hybridized (e.g., multiplication, addition, or the like) in a way suitable for sensitivity, and the variation "$V_{under}$" may be designated according to the hybridized evaluation functions. At this point, if a driver operates the brake, the driver is controlling a deceleration with his/her operation of the brake and therefore the adjustment of the deceleration by the control is not carried out preferably (so as not to bother the driver). Therefore, in the embodiment, a smaller reduction range is designated when the brake operation amount is greater as illustrated in FIG. 3. If the accelerator operation change amount, i.e., a returned amount is large, the driver expects large deceleration. Therefore, in the embodiment, the reduction range is increased when the accelerator operation change amount increases as illustrated in FIG. 3 so as to respond to the expectation. In general, the deceleration when the accelerator is turned off is larger if a steered amount is large than if the steered amount is small (e.g., in traveling straight ahead) in the vehicle (the velocity reduces due to an increase in resistance caused by turning). Therefore, in the embodiment, a large reduction range is designated to give a feeling of deceleration without fail to prevent an uncomfortable feeling of the driver when the steered amount is large as in FIG. 3.

Figure 4:
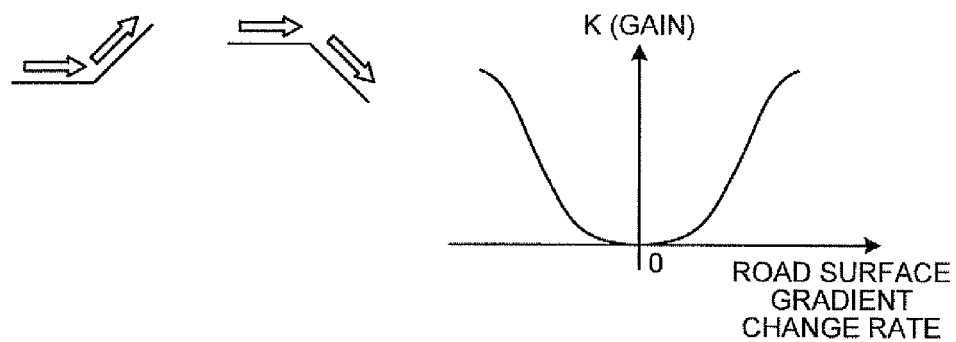
FIG. 4 illustrates a diagram illustrating an example of a relationship between a gain and a road surface gradient change amount.

Referring back to FIG. 2, the ECU 13 designates a value of a variation "K" for retaining a gain based on a change rate of the road surface gradient detected by the G sensor 17 (the unit is "gradient/second") based on the change rate (step S4). At this point, an example of a method of designating the gain will be described with reference to FIG. 4. FIG. 4 illustrates a diagram illustrating an example of a relationship between the gain and the road surface gradient change rate. The ECU 13 designates the value of the variation "K" based on the road surface gradient change rate and with reference to the preset map in FIG. 4. In this manner, the gain for drastically changing the undershoot amount when the road surface gradient changes drastically (bumps and dips) is designated.

Referring back to FIG. 2, the setting unit 13b sets (updates) a value of a variation "$V_{target}$" based on the target velocity, the value of the variation "$V_{under}$" designated in step S3, and the value of the variation "K" designated in step S4 (step S5). More specifically, a value obtained by subtracting a product of the value of the variation "K" and the value of the variation "$V_{under}$" from the target velocity is substituted into the variation "$V_{target}$". At this point, the variation "$V_{target}$" is used for retaining the second target velocity in pieces of processing in steps S3 to S7 and is used for retaining the first target velocity in pieces of processing in steps S8 to S11.

Next, the adjusting unit 13c optimally uses the engine 10, the T/M 11, the brake device 18, and the like based on the value of the variation "$V_{target}$" set in step S5 to thereby carry out velocity adjusting control of the vehicle 1 (step S6). More specifically, the adjusting unit 13c adjusts the velocity of the vehicle 1 by optimally controlling the engine 10, the T/M 11, the brake device 18, and the like so that the velocity conforms to the value of the variation "$V_{target}$".

Next, the determining unit 13d determines whether the actual velocity "V" of the vehicle 1 after the processing in step S6 is a value not greater than the value of the variation "$V_{target}$" set in step S5. In other words, it determines whether the velocity of the vehicle 1 has converged to the second target velocity.

Then, the ECU 13 assumes that the velocity of the vehicle 1 has not converged to the second target velocity (the velocity of the vehicle 1 has not reduced to the second target velocity) and returns to the processing in step S3 when the determining unit 13d determines that the actual velocity "V" is not the value not greater than the variation "$V_{target}$" (step S7: No).

The ECU 13 assumes that the velocity of the vehicle 1 has been converged to the second target velocity (the velocity of the vehicle 1 has reduced to the second target velocity) and returns to the processing in step S1 when the determining unit 13d determines that the actual velocity "V" is the value not greater than the variation "$V_{target}$" (step S7: Yes).

Figure 5:
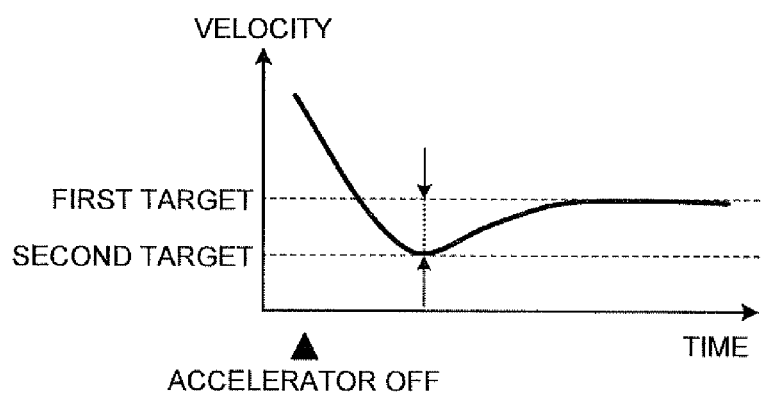
FIG. 5 is a graph illustrating an example of a velocity with time when the vehicle travel control processing is carried out.

As a result of the above pieces of processing, the velocity of the vehicle 1 which was higher than the preset target velocity (first target velocity) has been reduced to the second target velocity along a shape (slope) of a curve illustrated in FIG. 5. FIG. 5 is a graph illustrating an example of the velocity with time when the vehicle travel control processing is carried out.

Figure 6:
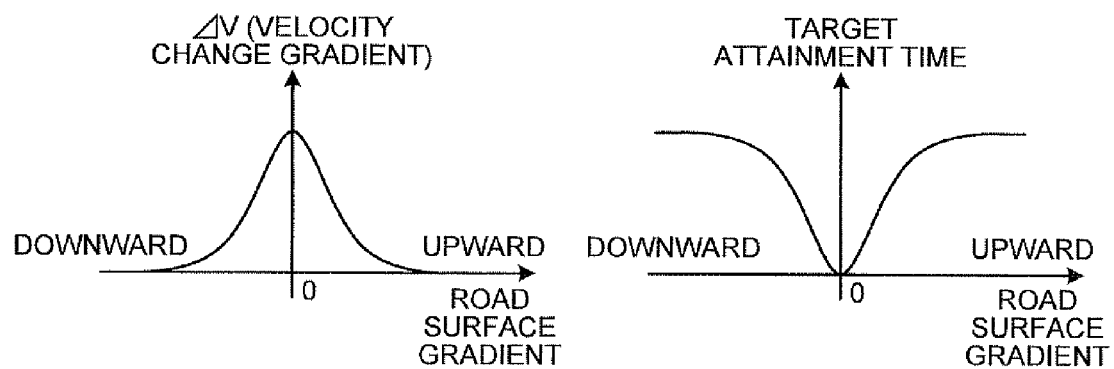
FIG. 6 illustrates diagrams illustrating an example of a relationship between the road surface gradient and a velocity change gradient.

Then, if the actual velocity "V" is not higher than the target velocity (step S2: No), the ECU 13 designates a value of a variation "ΔV" for retaining a velocity change gradient according to the road surface gradient detected by the G sensor 17 (step S8). At this point, an example of a method of designating the velocity change gradient will be described with reference to FIG. 6. FIG. 6 illustrates diagrams illustrating an example of a relationship between the road surface gradient and the velocity change gradient. The ECU 13 designates the value of the variation "ΔV" based on the road surface gradient and with reference to the preset left map in FIG. 6. If the velocity change gradient is determined in this manner, as illustrated in the right map in FIG. 6, converging to the target velocity (attainment time) is fast on a flat road with a small gradient. On an upward slope road with a large gradient, the larger the gradient, the slower the converging to the target velocity (attainment time) is.

Referring back to FIG. 2, the setting unit 13b sets (updates) the value of the variation "$V_{target}$" based on the value of the variation "ΔV" designated in step S8 (step S9). More specifically, the setting unit 13b adds the value of the variation "ΔV" to the variation "$V_{target}$".

Next, the setting unit 13b further sets (updates) the value of the variation "$V_{target}$" based on the value of the variation "$V_{target}$" set in step S9 and the target velocity (step S10). More specifically, the setting unit 13b substitutes smaller one of the target velocity and the value of the variation "$V_{target}$" after the update in step S9 into the variation "$V_{target}$".

Next, the adjusting unit 13c carries out the velocity adjusting control of the vehicle 1 based on the value of the variation "$V_{target}$" after the update in step S10 and by optimally using the engine 10, the T/M 11, the brake device 18, and the like (step S11). More specifically, the adjusting unit 13c adjusts the velocity of the vehicle 1 by optimally controlling the engine 10, the T/M 11, the brake device 18, and the like so that the velocity conforms to the value of the variation "$V_{target}$". Then, the ECU 13 returns to the processing in step S1.

As a result of the above pieces of processing, the velocity of the vehicle 1 which was reduced to the second target velocity has been converged (returned) to the first target velocity along the shape of the curve illustrated in FIG. 5 (without exceeding (overshooting) the first target velocity).

3. Summary of the Embodiment

As described above, the ECU 13 designates the value of the variation "$V_{under}$" based on at least one of the information about the driver's operation, the velocity, and the road surface gradient when the actual velocity "V" of the vehicle 1 is higher than the preset target velocity, sets the value of the variation "$V_{target}$" based on the designated value of the variation "$V_{under}$" and the target velocity, adjusts the velocity of the vehicle 1 to the velocity of the set value of the variation "$V_{target}$", and determines whether the actual velocity "V" of the vehicle 1 after the adjustment is the value not greater than the value of the variation "$V_{target}$". Then, the ECU 13 converges the velocity of the vehicle 1 to the target velocity after it has been determined that the actual velocity "V" is the value not greater than the value of the variation "$V_{target}$" (i.e., after the velocity of the vehicle 1 has been reduced to the second target velocity).

In other words, the ECU 13 sets the second target velocity lower than the original first target velocity according to the velocity when the accelerator pedal is turned off, converges the velocity of the vehicle to the set second target velocity, and then returns it to the original first target velocity. In bringing the actual velocity of the vehicle 1 close to the target velocity when the accelerator is turned off, to bring the actual velocity close to the target velocity when the actual velocity is higher than the target velocity, the ECU 13 converges the actual velocity to the target velocity after carrying out the undershoot set according to the vehicle traveling condition. If the actual velocity is lower than the target velocity, the ECU 13 converges the velocity of the vehicle 1 to the target velocity so that the velocity does not exceed the target velocity even if the attainment time of the target velocity is long.

The ECU 13 designates the undershoot amount according to the vehicle traveling condition. More specifically, the ECU 13 designates the small value as the value of the variation "$V_{under}$" when the operation amount of the brake pedal is large, designates the large value as the value of the variation "$V_{under}$" when the operation change amount of the accelerator pedal is large, and designates the large value as the value of the variation "$V_{under}$" when the steering angle operation amount of the steering is large.

Thus, even if the target velocity is a very low velocity such as few kilometers per hour, it is possible to adjust the vehicle velocity without giving an uncomfortable feeling to the driver. More specifically, in carrying out the control for following the target velocity when the accelerator is turned off, it is possible to adjust the vehicle velocity without giving an uncomfortable feeling to the driver due to the traveling condition such as the driver's operation, the road surface gradient, and the velocity. Moreover, in bringing the velocity close to the target vehicle velocity by deceleration, it is possible to decelerate without giving an uncomfortable feeling to the driver. Furthermore, in following the target velocity, it is possible to achieve optimal velocity adjustment without giving an uncomfortable feeling to the driver due to the driver's operation.

At this point, in following a velocity by turning off the accelerator from a high velocity, the driver expects deceleration if the velocity is higher when the accelerator is turned off, the driver is likely to feel as if the vehicle is accelerating over the target velocity, even if the vehicle is actually decelerating. On the other hand, in following a velocity by turning off the accelerator from a low velocity, the driver is likely to feel ups and downs in the velocity at the low velocity and less likely to feel that the attainment time to the target velocity is long. Therefore, if the velocity becomes a certain velocity after it exceeds the target velocity, the driver is likely to feel as if the vehicle is decelerating. On the other hand, if the attainment time of the target velocity is long to some extent, the driver does not feel an uncomfortable feeling. Furthermore, in following a velocity by turning off the accelerator when a road surface gradient is upward, the driver expects that the vehicle will decelerate drastically and therefore is likely to feel as if the vehicle is accelerating, even if the velocity is not actually exceeding the target velocity.

However, in the embodiment, if the present velocity is higher than the target velocity at the start of the velocity following control, the velocity is temporarily reduced to the second target velocity lower than the target velocity (undershoot) and then is converged to the target velocity while controlled so as not to exceed the target velocity. Therefore, it is possible to solve all of the above problems.

If the road surface gradient changes drastically (bumps and dips), the driver expects that the velocity changes drastically and therefore the driver is likely to feel that the vehicle is accelerating, even if the vehicle is not actually changing. In the embodiment, however, the gain according to the road gradient is designated and the undershoot amount is changed drastically according to the road surface gradient by using the designated gain and therefore this problem is solved.

Moreover, even if the velocity increases in the same way, a feeling of acceleration which the driver feels is different depending on a degree of the road surface gradient. For example, if the road gradient is large, the driver feels as if the vehicle is accelerating more than the actual velocity. In the embodiment, when the velocity at the start of the control is lower than the target velocity, the velocity is increased in different ways according to the road surface gradient and therefore it is possible to solve the problem.

Industrial Applicability

As described above, the vehicle travel control device according to the present invention can be used suitably especially in an automobile manufacturing industry and is extremely effective.

The invention claimed is:

1. A vehicle travel control device that performs velocity following control so as to converge a velocity of a vehicle operated by a driver to a preset first target velocity, the device comprising:
 a designating unit that designates a reduction range in the velocity based on information obtained in advance related to the driver's operation if the velocity of the vehicle at start of the velocity following control is higher than the first target velocity; and
 a setting unit that sets a second target velocity lower than the first target velocity based on the reduction range designated by the designating unit and the first target velocity, wherein
 the information related to the driver's operation includes information related to at least one of an operation amount of a brake pedal, an operation change amount of the accelerator pedal, and a steering angle operation amount of a steering,
 the designating unit is configured to designate a small value for the reduction range if the operation amount of the brake pedal is large, designate a large value for the reduction range if the operation change amount of the accelerator pedal is large, and designate a large value for the reduction range if the steering angle operation amount of the steering is large, and
 the velocity following control is performed such that, if the velocity of the vehicle at start of the velocity following control is higher than the first target velocity, the second target velocity is set by operation of the designating unit and the setting unit, and the velocity of the vehicle is converged to the second target velocity and then converged to the first target velocity.

* * * * *